April 9, 1935.  C. C. FUERST  1,997,331
CAMERA SHUTTER
Filed July 18, 1934
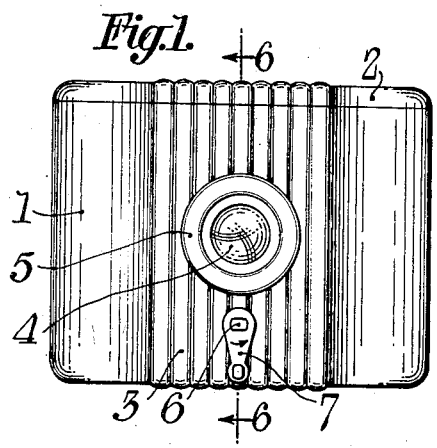
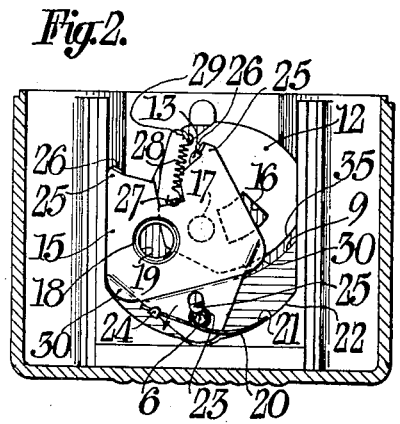
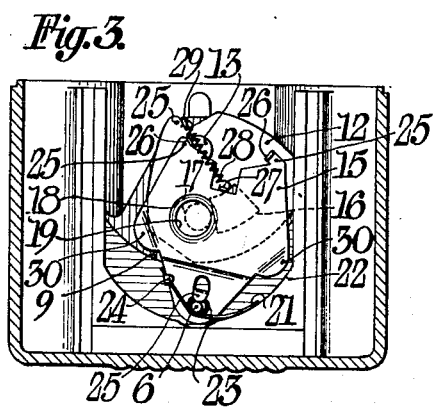
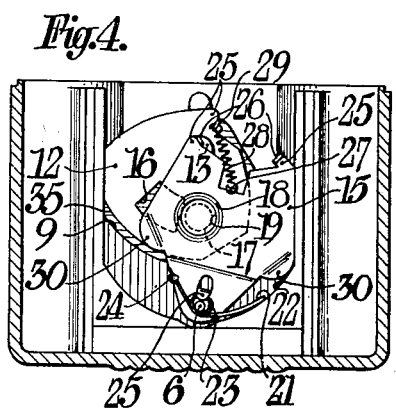
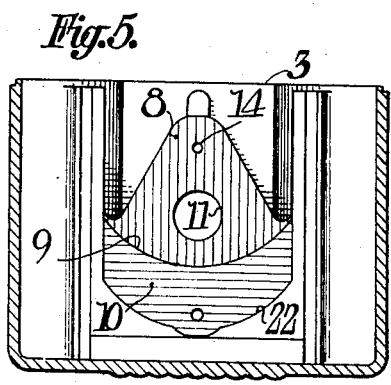
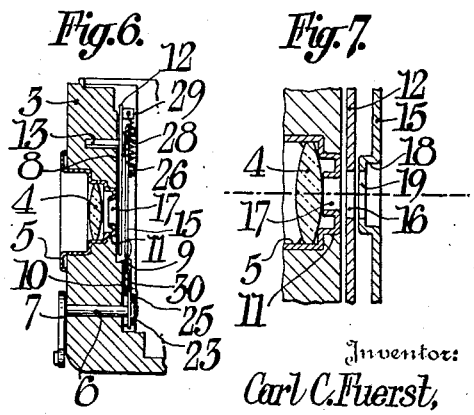
Inventor:
Carl C. Fuerst,
Attorneys Patented Apr. 9, 1935

1,997,331

UNITED STATES PATENT OFFICE 1,997,331

CAMERA SHUTTER

Carl C. Fuerst, Rochester, N. Y., assignor to Eastman Kodak Company, Rochester, N. Y., a corporation of New York Application July 18, 1934, Serial No. 735,732

11 Claims. (Cl. 95—60)

This invention relates to photography and more particularly to shutters for photographic cameras. One object of my invention is to provide a simple and inexpensive camera shutter. Another object is to provide a shutter constructed of a minimum number of parts and one which is simple to assemble. Another object of my invention is to provide a shutter consisting primarily of a shutter blade and a cover blade, each pivotally mounted and connected by a spring and to provide a mechanical means for accelerating the action of the spring. Other objects will appear from the following specifications. The novel features being particularly pointed out in the claims at the end thereof.

Coming now to the drawing wherein like reference characters denote like parts throughout:

Figure 1 is a front elevation of a camera including a shutter constructed in accordance with and embodying a preferred form of my invention:

Figure 2 is a section through the camera body shown in Figure 1 with the shutter parts shown in their normal position of rest;

Figure 3 is a similar view, but that the parts moved almost to the position from which an exposure will be started;

Figure 4 is a similar view, but that the parts positioned as they appear after an exposure has been completed;

Figure 5 is a similar view, but that the shutter parts removed from the camera;

Figure 6 is a fragmentary sectional view taken on line 6—6 of Fig. 1 with the shutter part shown in elevation; and Figure 7 is an enlarged fragmentary detail section showing the relation of certain shutter parts to the aperture.

In Fig. 1 I have shown as an embodiment of my invention a camera of the simple non-folding or box type. This camera may consist of a body portion 1 which may be made of a moulded composition and which may include a top 2 removable from the body for loading film in the camera in any well known manner. The camera may have a front portion 3 carrying a lens 4, held in place by a lens cell 5, as best shown in Figure 6. The shaft 6 extends through the front wall 3 of the camera and supports shutter trigger 7 on the outside.

Referring to Fig. 5 the front wall 3 of the camera is provided with a seat for the shutter members.

This seat may consist of a supporting surface in the form of a plane 8 terminating in a curved flange 9 which leads up to a plane surface 10, spaced above the surface 8. The surface 8 is provided with an aperture 11 through which light passes to the film when an exposure is made. The object of providing the shutter seat with planes at different elevations is to make a light tight connection with the shutter parts as will more fully appear from the following description:

The shutter itself consists primarily of a shutter blade 12 which is pivoted upon a stud 13 passing into an aperture 14 formed in the shutter seat. There is a cover blade 15 mounted to turn upon the shaft 6 which passes through the shutter casing and which carries the trigger 7.

The shutter blade 12 is provided with an exposure opening 16 adapted to swing past the diaphragm opening 17 in the member 5, when the blade is moved to make an exposure.

The cover blade 15 is provided with a downwardly formed, annular flange 18, which surrounds an opening 19, and is also adapted to swing past the aperture 17 when moved by the trigger 7. The relative relation of these apertures and plates is shown in Fig. 7.

The cover blade 15 is normally held into position shown in Fig. 2 by means of spring 20 which may have one end 21 resting on a shoulder 22 formed in the camera seat and may, after encircling the end of shaft 6, engage a lug 24 on the shutter cover. A portion of the spring 23 encircling the shaft 6 is held in position by means of a lug 25 bent over upon it.

The cover blade 15 is also provided with a pair of spaced arms 25 terminating in upstanding lugs 26, these lugs being symmetrically placed with respect to the shaft 6. There is a third upstanding lug 27 to which one end of a spring 28 is attached, the other end being attached to shutter blade 12 to the lug 29 which is carried by blade 12. The cover blade 15 is also provided with a pair of angularly disposed edges 30, which are provided so that this plate will readily slide over the flange 9 in the camera seat, this being sometimes necessary because the plate 15 lies only a slight distance above the plane of the plane surface 10.

The spring 28 forms the sole means for moving the shutter blade 12. This spring is tensioned by moving the cover blade upon its pivot 6 through movement of the shutter trigger 6. As the trigger is moved, the cover plate is moved from a position shown in Figure 2 toward that shown in Figure 3. When in the position shown in Figure 3, it will be noted that the aperture 19 is almost in registration with the aperture 17 and that the spring 28 lies almost over the stud 13 upon which the shutter blade is pivoted.

At this point—that is before the spring 28 passes the stud 13—a lug 26 engages the spring between its ends. Thus the cover blade 15 in moving toward the position shown in Fig. 4 causes the lug 26 to push the spring 28 over the stud 13, thus momentarily accelerating the movement of the spring and by causing the spring to pass the pivot 13, causes it to move the shutter blade 12 to rapidly pass the aperture 17.

As will appear from Fig. 4, when the trigger 7 has been moved to its full extent to make an exposure, the aperture 19 in the cover blade 15 is in alignment with the exposure aperture 17. As the shutter blade 12 moves under the impulse of spring 28, the aperture 16 is swung between the apertures 17 and 19 as shown in Fig. 7, and an exposure is made.

Upon releasing the shutter trigger 7, the spring 20 will return it to its initial position as shown in Fig. 2. In returning the spring 28 is again tensioned and is given momentary acceleration by means of the second lug 26 so that the shutter blade 12 will snap across to its position of rest shown in Fig. 12. An exposure is not made during this return movement because the cover blade nearly reaches the position shown in Fig. 2 before the shutter blade 12 is moved. Thus, since the aperture 19 is not in alignment with the aperture 17 during this return movement, light is not permitted to enter to the film.

It should be noted that the exposure blade 12 is provided with an arcuate edge 35 and this edge is spaced only a short distance from the arcuate flange 9 between the planes 8 and 10 of the shutter seat. It is, therefore, impossible for light to strike the shutter blade 12 and to be reflected beneath it around past the flange 9. Moreover, the cover blade 15 lies almost in the same plane as the shutter seat plane 10, in which position it is spaced slightly above the shutter blade 12 so that these two may pass freely without any friction. This cover plate likewise serves to prevent light from leaking around the shutter blade 12 or past the aperture 16 or the flange 9.

In addition I prefer to form an annular flange 18 around the aperture 19 so that this portion of the cover plate lies very close to the surface of the shutter blade 12 as best shown in Fig. 7.

The operation of my improved shutter is simple. With the parts positioned as in Fig. 2, the trigger 7 is moved in the direction shown by the arrow Fig. 1. This causes the cover plate to move toward the position shown in Fig. 4 through the position shown in Fig. 3. About the time that the cover plate 15 reaches the position shown in Fig. 3, a lug 26 engages the spring 28 between its ends accelerating the movement of the spring momentarily and causing an exposure to be made. The parts are then in the position shown in Fig. 4. Releasing the trigger, the parts return to the position shown in Fig. 2, the shutter blade being moved after the cover blade has tensioned the spring, accelerating its movement through the lug 26, engaging the spring between its ends and causing it to return the shutter blade to its initial position.

Not only does the acceleration of the spring, just before its release always cause the exposure to be the same regardless of the speed of movement of the trigger, but in addition it effectively counteracts any tendency on the part of the shutter blade to stick. In other words, if the shutter blade should tend to bind or not move freely, a lug 26, by engaging the spring near its point of attachment 29 to the shutter blade 12, will thrust the shutter blade positively and serve as a starting impulse to the shutter blade. This construction has a very material advantage over relying solely on the tension of the spring as it is tensioned and drawn past a "dead center" by means of the relative movement of the shutter blade and cover blade.

Having now particularly described my invention, what I desire to secure by Letters Patent of the United States and what I claim is:

1. In a photographic shutter, the combination with shutter mechanism, a shutter blade, a spring for actuating the shutter blade, a trigger, means controlled by the trigger for tensioning and releasing said spring, and means actuated by said trigger for imparting a starting influence to said spring.

2. In a photographic shutter, the combination with shutter mechanism, a pivoted shutter blade, a spring for actuating said blade by passing the pivot of said shutter blade, a trigger, means actuated by the trigger for moving the spring, and means also actuated by the trigger for speeding up the movement of the spring past the blade pivot.

3. In a photographic shutter, the combination with the shutter mechanism, a pivot, a shutter blade mounted to swing thereon, a spring for actuating the shutter blade, a trigger, means under control of the trigger for tensioning the spring in two directions said means also including spring engaging lugs adapted to momentarily engage the spring and release it to operate the shutter blade.

4. In a photographic camera shutter the combination with two symmetrical pivoted members, one a shutter blade and the other a cover blade, of a spring connecting said members for moving one from the other, and means including an arm carried by one member adapted to engage said spring to facilitate starting the other member moving under the impulse of said spring.

5. In a photographic shutter, the combination with a shutter blade including an exposure opening, a cover blade including an opening adapted to register with the shutter blade opening, a spring connecting said shutter blade and cover blade for moving the former from the latter, a trigger for moving the shutter blade and means associated with the cover blade for engaging and moving said spring to start the exposure blade movement to make an exposure.

6. In a photographic shutter, the combination with a shutter supporting member, spaced pivots on the support, a cover blade and a shutter blade mounted on the separate pivots, a trigger extending outside of the supporting member for moving the cover blade in one direction, a spring normally holding the cover blade in an opposite direction, a spring connecting the shutter and exposure blades for moving the latter from the former, and means carried by the cover blade tending to engage and move the spring between its two ends, to help initiate movement of the shutter blade.

7. In a photographic camera shutter, the combination with a shutter blade pivoted to a support, a cover blade pivoted to the support, openings in the shutter blade and cover blade adapted to register, when said parts are in predetermined position, a spring connecting said blades being so positioned relatively to the pivotally mounted blades that the cover blade may be moved to tension the spring and move it past one pivot and past a dead center for moving the shutter blade by the spring, and means carried by the cover blade tending to engage the spring and move it past dead center.

8. In a photographic shutter, the combination with a support for shutter mechanism comprising a plane surface having an exposure aperture therethrough a shutter blade pivotally mounted on said plane surface, a shoulder on said plane at an edge thereof, a second plane surface spaced from the first, a pivotally mounted cover blade carried by the second plane surface whereby the shutter blade and cover blade may be offset and light tight with respect to each other.

9. In a photographic shutter, the combination with a pivotally mounted shutter plate and opposite pivotally mounted cover plate, a pair of arms on the cover plate having spaced upstanding lugs, a spring connecting the central portion of the cover plate between said lugs to the shutter plate, a trigger for moving the cover plate in one direction, and a spring for moving the plate in an opposite direction, one lug tending to engage and push the spring in moving under the impulse of the trigger and the other lug engaging the spring when said cover plate is moved by said spring.

10. In a photographic shutter, the combination with shutter mechanism including a plate, a pivotal support on which said plate may move, a spring, encircling said pivotal support for moving said plate, the spring engaging a lug on said plate at one end and being relatively fixed at the other, and means comprising a lug, bent from said plate for confining the spring looped about the pivotal support to a predetermined position.

11. In a photographic shutter, the combination with shutter mechanism including a shutter blade having an arcuate edge, a pivot upon which said blade may oscillate, a support for said blade including a plane surface, an arcuate flange extending from said plane surface concentric with said shutter leaf edge, a cover blade, a support for said cover blade comprising a second plane surface spaced from the first terminating in the arcuate flange, said cover plate lying substantially in the plane of the second plane surface whereby a light tight connection is formed between the shutter blade, cover blade and their supports.

CARL C. FUERST.